United States Patent
Lackey, Jr.

(10) Patent No.: US 6,598,846 B1
(45) Date of Patent: Jul. 29, 2003

(54) UNIVERSAL HANGER BALL FOR CEILING FAN

(75) Inventor: Robert W. Lackey, Jr., Hickory, NC (US)

(73) Assignee: Prime Home Impressions, LLC, Coppell, TX (US)

( * ) Notice: Subject to any disclaimer, the term of this patent is extended or adjusted under 35 U.S.C. 154(b) by 0 days.

(21) Appl. No.: 09/643,411

(22) Filed: Aug. 22, 2000

(51) Int. Cl.[7] .................................................. B42F 13/00
(52) U.S. Cl. ........................... 248/343; 248/345; 416/5; 416/244 R; 403/378
(58) Field of Search .................................. 248/343, 342, 248/613, 345; 416/5, 170 R, 244 R, 246; 417/360; 403/3, 379.3, 378

(56) References Cited

U.S. PATENT DOCUMENTS

| | | | | |
|---|---|---|---|---|
| 2,882,005 A | * | 4/1959 | Ramsing | 248/343 |
| 3,797,865 A | | 3/1974 | Ballentine | |
| 4,565,493 A | * | 1/1986 | Hallerback | 416/204 R |
| 4,714,230 A | | 12/1987 | Huang | |
| 4,729,725 A | * | 3/1988 | Markwardt | 417/423.15 |
| 4,878,806 A | * | 11/1989 | Markwardt | 416/5 |
| 5,090,654 A | * | 2/1992 | Ridings et al. | 248/343 |
| 5,154,579 A | * | 10/1992 | Rezek | 248/343 |
| 5,222,864 A | * | 6/1993 | Pearce | 416/5 |
| 5,984,640 A | * | 11/1999 | Wang | 416/244 R |
| 6,102,663 A | * | 8/2000 | Wang | 416/244 R |
| 6,116,559 A | * | 9/2000 | Lackey | 248/343 |
| 6,139,279 A | * | 10/2000 | Pearce et al. | 416/244 R |
| 6,234,757 B1 | * | 5/2001 | Pearce | 416/244 R |
| 6,311,943 B1 | * | 11/2001 | Tang | 248/317 |
| 6,357,714 B1 | * | 3/2002 | Johnson | 248/343 |
| 6,382,917 B1 | * | 5/2002 | Zuege | 416/210 R |
| 6,394,757 B1 | * | 5/2002 | Lackey | 416/244 R |
| 6,488,439 B1 | * | 12/2002 | Lackey, Sr. | 403/305 |
| 2002/0141873 A1 | * | 10/2002 | Lackey | 416/244 R |

* cited by examiner

*Primary Examiner*—Leslie A. Braun
*Assistant Examiner*—Naschica S. Morrison
(74) *Attorney, Agent, or Firm*—Charles L. Schwab; Nexsen Pruet Jacobs & Pollard, LLC

(57) ABSTRACT

A ceiling fan hanger ball is provided with features to permit universal acceptance of downrods there from.

2 Claims, 2 Drawing Sheets

UNIVERSAL HANGER BALL FOR CEILING FAN

This invention relates generally to the art of ceiling fans and more particularly to an adaptor to permit interchangeable components for different size fixtures.

BACKGROUND OF THE INVENTION

In the art of ceiling fans, such fans are normally suspended from a ceiling through a fixture which permits attachment of a downrod which extends downwardly to an appropriate position for placement of the fan and motor. The downrod is generally a hollow metallic feature threaded at both ends, much in the nature of a metallic plumbing pipe to permit threaded attachment to the ceiling and to the fan motor. Such downrods generally come in two sizes, ½" and ¾" outer diameter. The existing of the two sizes thus requires the existence of two sizes of mounting fixtures both for the ceiling and for the fan motor.

SUMMARY OF THE INVENTION

It is thus an object of this invention to provide an adaptor for permitting interchangeable components so as to utilize two sizes of downrods.

It is a further and more particular object of this invention to provide an adaptor for a downrod hanger ball so as to permit the same hanger ball to be utilized for multiple sizes of downrods.

These as well as other objects are accomplished by an improvement in the form of an adaptor permitting engagement of a hanger ball by a smaller size downrod wherein the adaptor is in the form of a threaded cylinder having a threaded outside for engagement by the hanger ball and a threaded inside for engagement by the smaller downrod. The downrod and adaptor have aligned diametric holes for receipt of a retaining pin. The hanger ball has a shoulder above the portion thereof for supporting and immobilizing the pin therein.

BRIEF DESCRIPTION OF THE DRAWINGS

FIG. 3 is a partial cut away of this invention in its assembled from.

DETAILED DESCRIPTION

In accordance with this invention it has been found that a single size hanger ball for a ceiling fan may be utilized for multiple size downrods through the use of a simple adaptor of this invention. Such adaptor permits the retailer to commit much less space to a variety of such hanger balls and to permit the sales of hanger balls and adaptors as a single unit so that the consumer may purchase one packaged product which will fit any size downrod. Various other features and advantages will become apparent from a reading of the following detailed description given with reference to the various figures of drawing.

Figure 1:
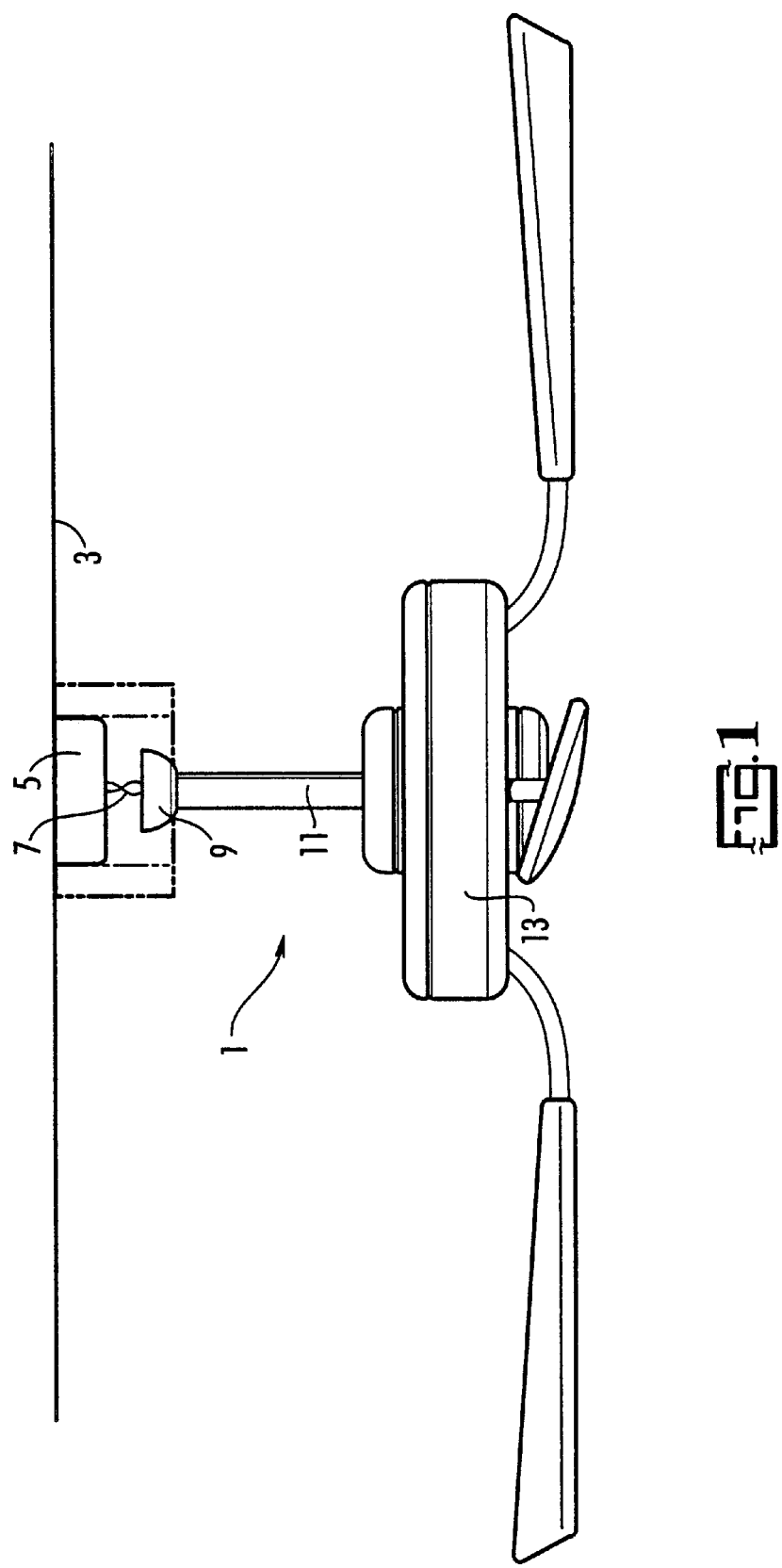
FIG. 1 of the drawings is a partial cut away of a mounted ceiling fan.

FIG. 1 illustrates a typical ceiling fan 1 mounted to a ceiling 3 through a standard electrical box 5 having wiring 7 therein, proceeding to a hanger ball 9 connected to a downrod 11. The downrod 11 is then connected and supports fan motor 13 and the associated blades. It is the hanger ball 9 and downrod 11 about which the improvement of this invention relates. In accordance with this invention hanger ball 9 may be adapted for receipt of a ¾" downrod 11. It may be utilized with a ½" downrod utilizing the improvement of this invention.

Figure 2:
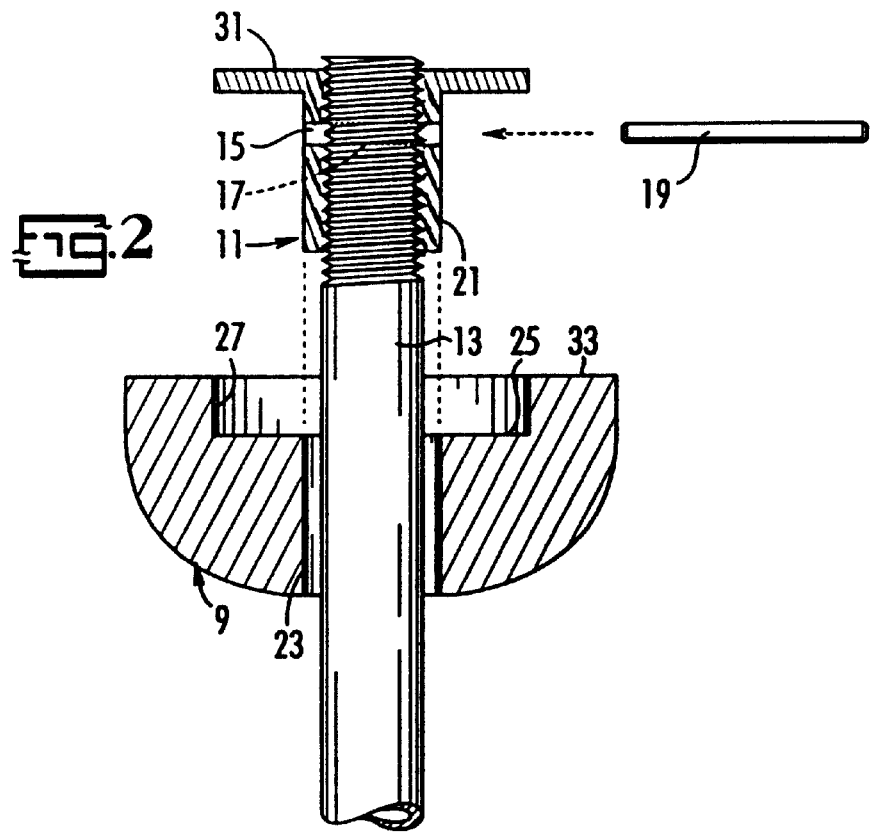
FIG. 2 is a partial cut away assembly view of the improvement of this invention.

FIG. 2 of the drawings illustrates, in an assembly view, the adaptor 11 of this invention engaging a smaller size downrod 13. Both the adaptor 11 and downrod 13 have diametrically opposed holes 15 and 17 for receipt of a pin 19 there through.

Adaptor 11 is engaged on the inside surface thereof to receive portions of downrod 13 and to permit alignment of diametric holes 15 and 17 when appropriately inserted for engagement by pin 19. Outer surface 21 of adaptor 11 is smaller than the size of the opening 23 within hanger ball 9. Opening 23 receives the outer surface 21 of adaptor 11. Hanger ball 9 has a shoulder 25 with upstanding concentric wall 27, all of which receive pin 19 to retain engagement pin within the diametric holes 15 and 17 and to assure that downrod 13 does not pass through hanger ball 9. Adaptor 11 has a flanged upper terminus 31 adapted to engage the upper surface 33 of ball 9 as a further safety feature associated with the support of a fan structure.

Figure 3:
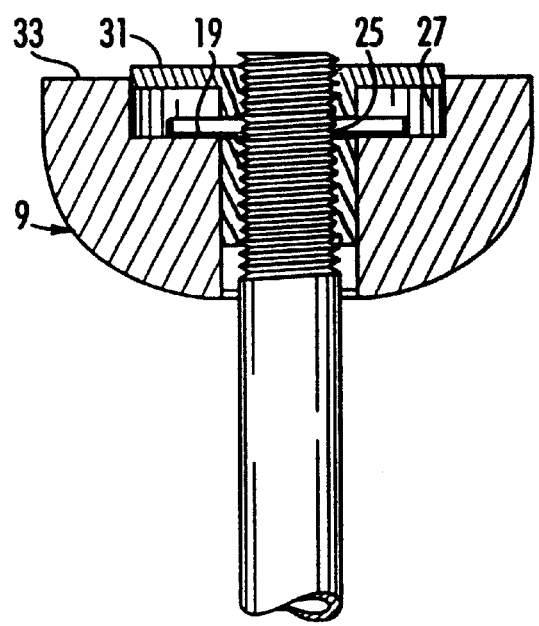

To assemble the improvement of this invention, initially downrod 13 is placed into adaptor 11 until diametric holes 15 and 17 are aligned. After alignment of diametric holes 15 and 17 pin 19 is inserted therethrough. Hanger ball 9 is then placed around the adaptor 11 through the mating surface 21 and opening 23. The joinder is continued until pin 19 rests upon surface 25. It is thus seen that pin 19 is retained within recess of ball 9 by the concentric wall 27 thereof. Flange 31 at such point rests upon the upper surface 33 of ball 9 to complete the assembly thereof as illustrated in FIG. 3.

It is thus seen that this invention permits utilization of a hanger ball for a variety of downrod sizes. It is further seen that this invention permits a reduction in retail space associated with a variety of hanger ball sizes since one ball with an adaptor may be sold to fit all sizes.

As the above description is exemplary in nature many variations will become apparent to those with skill in the art. Such variations however are embodied within the spirit and scope of this invention as defined the following appended claims.

What is claimed is:

1. A support for a ceiling fan comprising:
   an electrical box,
   a truncated ball unit having
      a flat top surface,
      a spherically shaped bottom supported by said electrical box,
      a stepped diameter vertical opening extending vertically through said ball unit including
         a cylindrical downrod bore for receiving a first downrod of a first exterior diameter,
         a cylindrical wall defining an enlarged bore above said cylindrical downrod bore and
         an upward facing horizontal shoulder between said cylindrical downrod bore and said enlarged bore,
      a cylindrically shaped adapter having
         a cylindrical exterior diameter complementary to said cylindrical downrod bore and,
         a cylindrical interior diameter with a threaded portion adapted for threaded engagement with a threaded exterior diameter end portion of a second downrod, said exterior diameter of said second downrod being smaller than said first exterior diameter of said first downrod, and
         aligned transverse openings in said threaded portions of said adapter and said second downrod, and a pin extending through said openings in said adapter and said second downrod, opposite ends of said pin resting on said horizontal shoulder of said ball unit, withdrawal of said pin from said openings being prevented by said cylindrical wall defining said enlarged bored.

2. The support as set forth in claim 1 wherein the upper end of said adapter includes an annular flange in downwardly confronting relation to said truncated ball unit.

\* \* \* \* \*